US009684198B2

(12) United States Patent
Okita et al.

(10) Patent No.: US 9,684,198 B2
(45) Date of Patent: Jun. 20, 2017

(54) LIQUID CRYSTAL DISPLAY DEVICE

(71) Applicant: Japan Display Inc., Minato-ku (JP)

(72) Inventors: Mitsutaka Okita, Tokyo (JP);
Kazuhiro Nishiyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/138,652

(22) Filed: Dec. 23, 2013

(65) Prior Publication Data

US 2014/0176885 A1    Jun. 26, 2014

(30) Foreign Application Priority Data

Dec. 26, 2012    (JP) ................................. 2012-282863

(51) Int. Cl.
*G02F 1/136*    (2006.01)
*G02F 1/1335*    (2006.01)
*G02F 1/1343*    (2006.01)
*G02F 1/1362*    (2006.01)

(52) U.S. Cl.
CPC .. *G02F 1/133512* (2013.01); *G02F 1/133514* (2013.01); *G02F 1/134309* (2013.01); *G02F 1/136209* (2013.01); *G02F 2001/134372* (2013.01)

(58) Field of Classification Search
CPC ......... G02F 1/136209; G02F 1/133512; G02F 1/133514; G02F 1/134309; G02F 1/134372
USPC .......................................................... 349/44
See application file for complete search history.

(56) References Cited

U.S. PATENT DOCUMENTS

| 2003/0128323 A1* | 7/2003 | Matsumoto ....... G02F 1/136213 349/141 |
| 2007/0132920 A1* | 6/2007 | Suzuki et al. ................ 349/107 |
| 2009/0122247 A1* | 5/2009 | Chang ............... G02F 1/134363 349/139 |
| 2011/0156995 A1* | 6/2011 | Choi ................. G02F 1/134363 345/92 |
| 2013/0155357 A1* | 6/2013 | Ota .............................. 349/110 |

FOREIGN PATENT DOCUMENTS

| JP | 2002-221736 A | 8/2002 |
| JP | 2010-8758 A | 1/2010 |
| JP | 2010-152394 | 7/2010 |
| JP | 2010-197576 A | 9/2010 |
| JP | 2010-231035 A | 10/2010 |
| JP | 2012-510683 A | 5/2012 |
| JP | 2012-118199 A | 6/2012 |
| JP | 2013-68949 A | 4/2013 |

OTHER PUBLICATIONS

Office Action issued Apr. 28, 2015 in Japanese Patent Application No. 2012-282863 (with English language translation).

* cited by examiner

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

According to one embodiment, a liquid crystal display device includes an array substrate, an opposed substrate and a liquid crystal layer. The array substrate includes a first line, a second line, a light shielding pattern, a first pixel electrode, and a second pixel electrode. The opposed substrate includes a light shielding layer, a first colored layer, and a second colored layer.

4 Claims, 5 Drawing Sheets

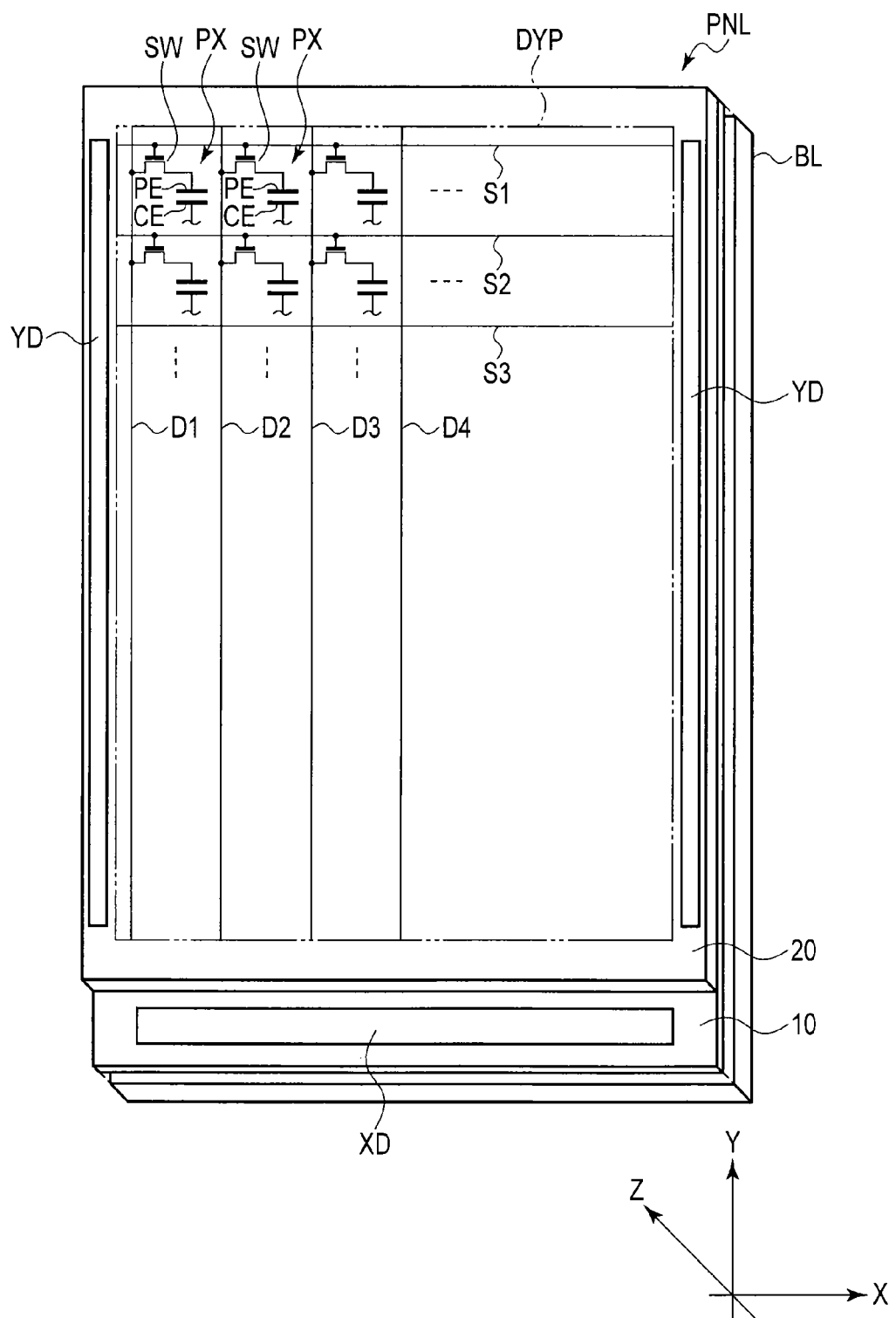
F I G. 1

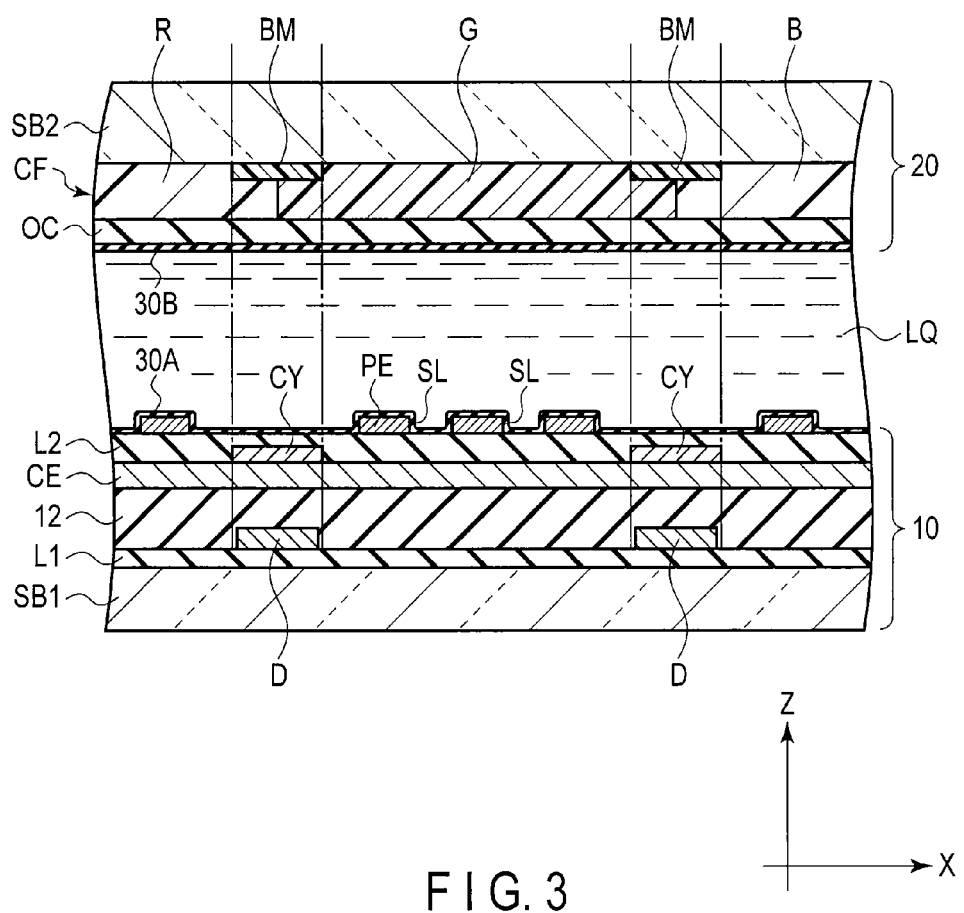
F I G. 3

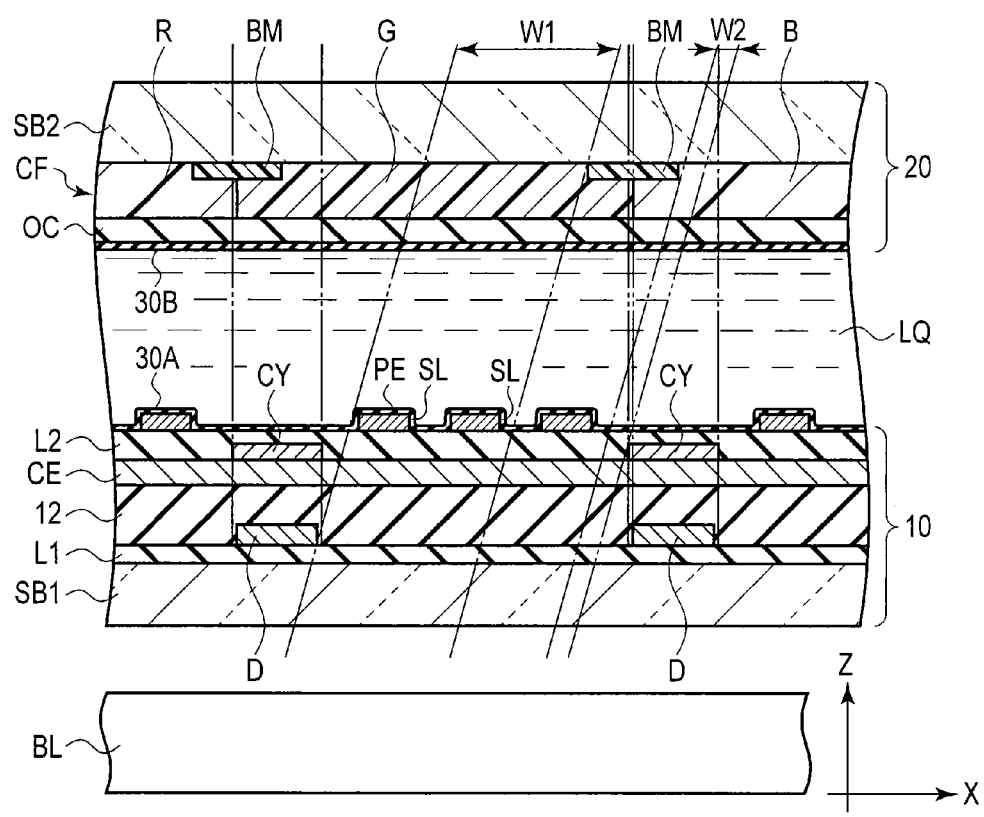
F I G. 4

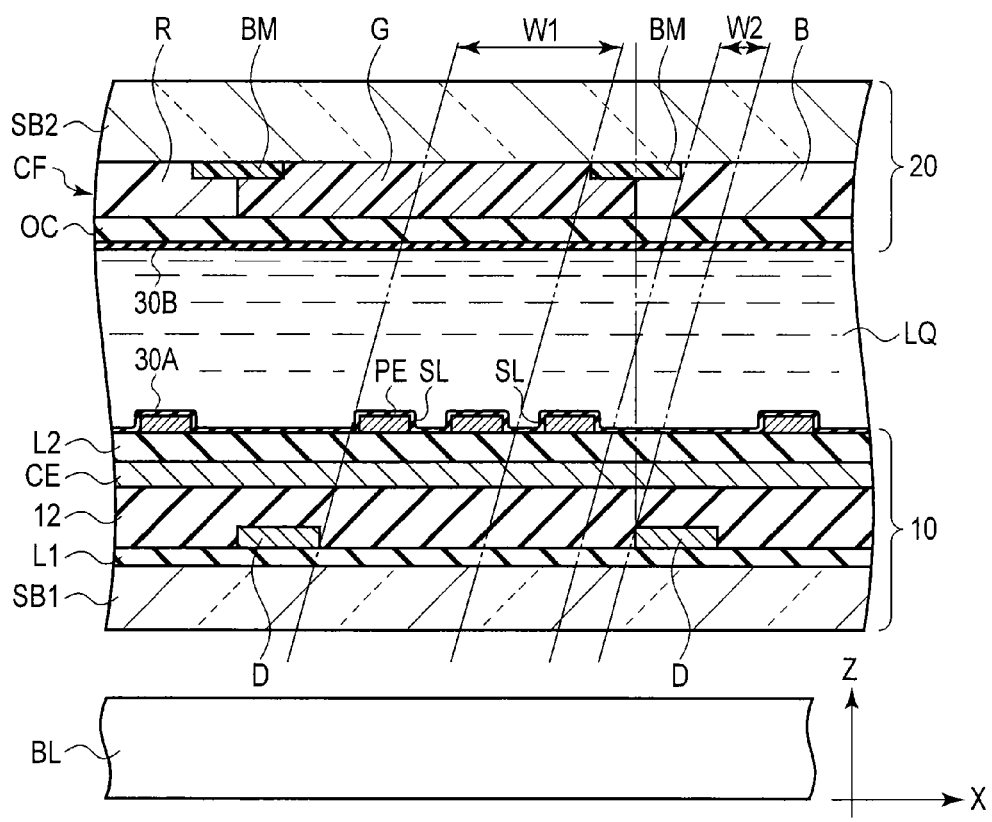
F I G. 5

LIQUID CRYSTAL DISPLAY DEVICE

CROSS-REFERENCE TO RELATED APPLICATIONS

This application is based upon and claims the benefit of priority from Japanese Patent Application No. 2012-282863, filed Dec. 26, 2012, the entire contents of which are incorporated herein by reference.

FIELD

Embodiments described herein relate generally to a liquid crystal display device.

BACKGROUND

Nowadays, flat display devices are being extensively developed. Among them, liquid crystal display devices are mounted on various electronic apparatuses, since they have such advantages as being lightweight, thin, and consuming little energy. As a method of controlling a liquid crystal alignment state, presented are display devices using a method of controlling the alignment state of liquid crystal with a vertical electric field such as twisted nematic (TN) mode and optically compensated bend (OCB) mode, and display devices using a method of controlling the alignment state of liquid crystal with a transverse electric field (including fringe electric field) such as in-plane switching (IPS) and fringe field switching (FFS) modes.

For example, resolution of display devices mounted on smartphones and tablet computers is being enhanced, and it is required to reduce the pixel size of liquid crystal display devices.

BRIEF DESCRIPTION OF THE DRAWINGS

FIG. 1 is a schematic diagram of an example of a liquid crystal display device according to an embodiment.

FIG. 3 is a diagram illustrating an example of a cross section of a liquid crystal display panel, taken along line III-III illustrated in FIG. 2.

FIG. 4 is a diagram for explaining an example of an effect of the liquid crystal display device according to the embodiment.

FIG. 5 is a diagram for explaining an example of an effect of the liquid crystal display device according to the embodiment.

DETAILED DESCRIPTION

Figure 2:
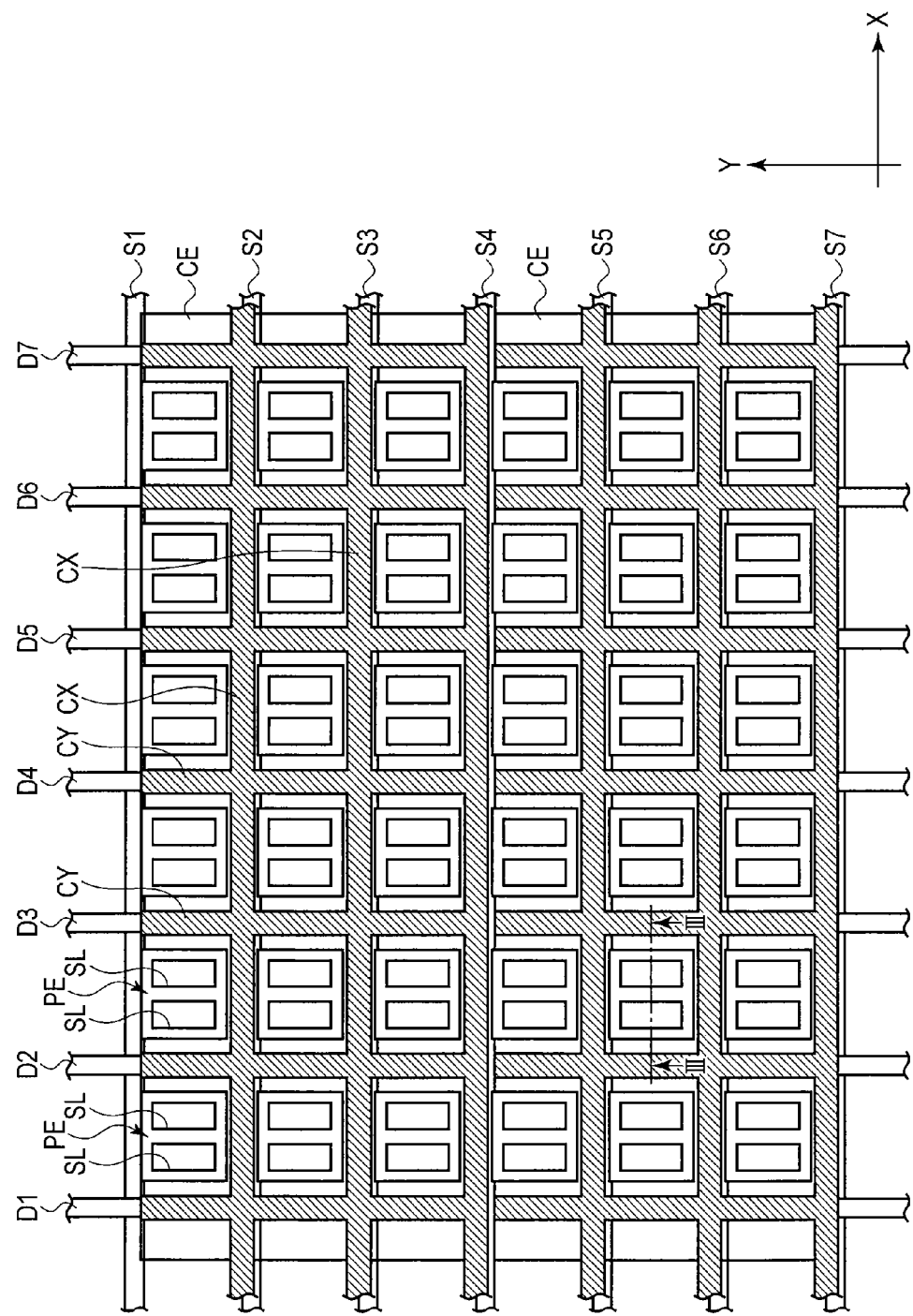
FIG. 2 is a diagram for explaining an example of a structure of a display module of an array substrate.

In general, according to one embodiment, there is provided a liquid crystal display device comprising: an array substrate comprising a first line extending in a first direction, a second line extending in a second direction crossing the first direction, a light shielding pattern disposed above the second line and opposed to the second line, a first pixel electrode disposed in a first area partitioned by the first line and the second line, and a second pixel electrode disposed in a second area partitioned by the first line and the second line and aligned with the first area in the first direction; an opposed substrate disposed opposite to the array substrate, the opposed substrate comprising a light shielding layer disposed in a position opposite to the second line, a first colored layer disposed opposite to the first pixel electrode, and a second colored layer adjacent to the first colored layer in the first direction and disposed opposite to the second pixel electrode; and a liquid crystal layer held between the array substrate and the opposed substrate.

A liquid crystal display device according to an embodiment will be explained hereinafter with reference to the drawings.

FIG. 1 is a schematic diagram of an example of a liquid crystal display device according to an embodiment. The liquid crystal display device includes a liquid crystal display panel PNL and a backlight unit BL.

The liquid crystal display panel PNL includes an array substrate 10, an opposed substrate 20 disposed opposite to the array substrate 10 with a predetermined gap therebetween, a liquid crystal layer LQ held between the array substrate 10 and the opposed substrate 20, and a display area DYP including pixels PX arranged in a matrix state.

The backlight unit BL illuminates the liquid crystal display panel from a back side. Various forms are applicable as the backlight unit BL, and either of a backlight using light-emitting diodes (LED) as a light source and a backlight using a cold cathode fluorescent lamp (CCFL) is applicable. Explanation of a detailed structure of the backlight unit BL is omitted.

The array substrate 10 includes a transparent insulating substrate SB1 (illustrated in FIG. 3) formed of glass or the like, a plurality of scanning lines S (S1, S2, . . . ), a plurality of signal lines D (D1, D2, . . . ) crossing the scanning lines S, switching elements SW arranged in the vicinity of respective positions, in each of which a scanning line (first line) S and a signal line (second line) D cross each other, insulating films L1 and L2 (illustrated in FIG. 3), a planarization film 12 (illustrated in FIG. 3), pixel electrodes PE arranged for the respective pixels PX, common electrodes CE opposed to the pixel electrodes PE, auxiliary lines CX and CY arranged on the common electrodes CE (illustrated in FIG. 2), an alignment film 30A, and a driving circuit disposed in a frame area surrounding the display area DYP.

The scanning lines S extend along rows (first direction X) of the pixels PX arranged in a matrix in the display area DYP. The signal lines D extend along columns (second direction Y) of the pixels PX arranged in a matrix in the display area DYP.

Each of the switching elements SW includes a thin-film transistor including a semiconductor layer (not shown) formed of polysilicon or the like. A gate electrode of each switching element SW is electrically connected to a corresponding scanning line S (or formed as one unitary piece). A source electrode of each switching element SW is electrically connected to a corresponding signal line D (or formed as one unitary piece). A drain electrode of each switching element SW is electrically connected to a corresponding pixel electrode PE (or formed as one unitary piece).

The driving circuit includes scanning-line driving circuits YD that drive the scanning lines S, and a signal-line driving circuit XD that drives the signal lines D. The scanning-line driving circuits YD are arranged on both sides of the display area DYP in a direction in which the scanning lines S extend, and are electrically connected with the scanning lines S extending from the display area DYP. The signal-line driving circuit XD is electrically connected with the signal lines D extending from the display area DYP.

A flexible substrate (not shown) is connected to an end portion of the array substrate 10, and the scanning-line driving circuits YD and the signal-line driving circuit XD are supplied with control signals and video signals from a signal source (not shown) through the flexible substrate.

FIG. 2 is a diagram for explaining an example of a structure of a display module of the array substrate 10. In FIG. 2, structures of the insulating layers, the switching elements, and the alignment film are omitted.

In the case where the liquid crystal display device is a liquid crystal display device of a color display type, the pixels PX include a plurality of types of color pixels. In the present embodiment, when the pixels PX include, for example, red pixels for displaying the color red, green pixels for displaying the color green, and blue pixels for displaying the color blue, one picture element is formed of three types of color pixels, that is, a red pixel, a blue pixel, and a green pixel. For example, in the display area DYP, red pixels, green pixels, and blue pixels are periodically arranged in the first direction X, and color pixels of the same color are arranged in line in the second direction Y.

Each common electrode CE extends along the first direction X to be opposed to a plurality of rows of the pixel electrodes PE. The common electrodes CE are arranged side by side in the second direction Y. The common electrodes CE are formed of transparent electrode material such as indium tin oxide (ITO) and indium zinc oxide (IZO).

The common electrodes CE can be used as sensor electrodes of a touchpanel. For example, the intensity of capacity generated between the user's fingertip and the common electrode CE changes according to the distance between the user's fingertip or tip of a stylus and the common electrode CE. It is possible to determine a position coordinate of the user's fingertip or the like in the second direction Y, by detecting potentials of all the common electrodes CE. In this case, sensor electrodes for determining a position coordinate in the first direction X may be arranged outside the liquid crystal display panel PNL or the like and opposed to the display area DYP.

The auxiliary lines CX and CY form a lattice shape, and include first auxiliary lines CX extending almost parallel with the scanning lines S, and second auxiliary lines CY extending almost parallel with the signal lines D. The first auxiliary lines CX extend from one end to the other end in the first direction X of the display area DYP, and extend to the frame area surrounding the display area DYP. The second auxiliary lines CY extend from one end to the other end in the second direction Y of the common electrodes CE. Specifically, the common electrodes CE are not connected to one another by the second auxiliary lines CY. On each common electrode CE, the first auxiliary lines CX are electrically connected to the second auxiliary line CY.

Each of the first auxiliary lines CX and the second auxiliary lines CY is a multi-layer line formed of, for example, molybdenum (Mo) and aluminum (Al). The first auxiliary lines CX are arranged in a layer higher than the scanning lines S and the switching elements SW. The second auxiliary lines CY are arranged in a layer higher than the signal lines D.

The first auxiliary lines CX and the second auxiliary lines CY are arranged directly on the common electrodes CE, and electrically connected to the common electrodes CE. Such arrangement of the first auxiliary lines CX and the second auxiliary lines CY as described above reduces the difference in potential of the common electrodes CE between the center part and the end parts of the display area DYP, and suppresses deterioration in the display quality.

Each pixel electrode PE is provided with slits SL extending in the second direction Y. Each pixel electrode PE is disposed to be opposed to an area surrounded by the scanning lines S and the signal lines D.

In other words, the pixel electrodes PE are arranged in respective areas partitioned by the scanning lines S and the signal lines D. Among the areas, areas aligned in the first direction are referred to as a first area and a second area. A pixel electrode (first pixel electrode) PE is disposed in a first area, and another pixel electrode (second pixel electrode) PE is disposed in a second area. Thus, the pixel electrode (first pixel electrode) PE and another pixel electrode (second pixel electrode) PE are aligned in the first direction X with the signal line D interposed therebetween.

In the liquid crystal display device of the present embodiment, the alignment state of the liquid crystal layer LQ is controlled by a transverse electric field generated between the pixel electrodes PE and the common electrodes CE. By providing the pixel electrodes PE with the slits SL, an electric field is generated between the pixel electrode PE and the common electrode CE also in the central part of each pixel PX, and the alignment state of the liquid crystal layer LQ can be controlled.

FIG. 3 is a diagram illustrating an example of a cross section of the liquid crystal display panel PNL, taken along line III-III illustrated in FIG. 2.

The transparent insulating substrate SB1 of the array substrate 10 is formed of, for example, glass or transparent resin. Although not shown in FIG. 3, the scanning lines S are arranged on the transparent insulating substrate SB1, and the scanning lines S are covered with the insulating layer L1. A polarizer (not shown) is attached outside the transparent insulating substrate SB1.

The signal lines D are arranged on the insulating layer L1. In the present embodiment, a width of each signal line D in the first direction X is about 3 μm.

The planarization layer 12 is disposed on the signal lines D. The planarization layer 12 is an organic insulating layer of silicon nitride ($Si_3N_4$) or the like. In the present embodiment, the planarization layer 12 has a width of about 2.5 μm in a third direction Z. The third direction Z is a direction almost orthogonal to the first direction X and the second direction Y.

The common electrodes CE are arranged on the planarization layer 12.

The second auxiliary lines CY are arranged directly on the respective common electrodes CE, and electrically connected to the respective common electrodes CE. In the present embodiment, a width of the second auxiliary lines CY in the first direction X is about 4 μm. The second auxiliary lines CY are arranged to be opposed to the signal lines D. The second auxiliary lines CY are covered with the insulating layer L2.

The pixel electrodes PE are arranged on the insulating layer L2. The pixel electrodes PE are covered with the alignment film 30A. The alignment film 30A has been subjected to alignment treatment, such as rubbing and optical alignment treatment. For example, resin such as polyimide can be used as a material of the alignment film 30A. In the present embodiment, rubbing is adopted as alignment treatment for the alignment film 30A.

The opposed substrate 20 includes a transparent insulating substrate SB2, a light shielding layer BM, a color filter CF, an overcoat layer OC, and an alignment film 30B.

The transparent insulating substrate SB2 of the opposed substrate 20 is formed of, for example, glass or transparent resin. A polarizer (not shown) is attached outside the transparent insulating substrate SB2. The polarizer of the array substrate 10 side and the polarizer of the opposed substrate 20 side are arranged such that their transmission axes are orthogonal to each other.

The light shielding layer BM is disposed on the transparent insulating substrate SB2. The light shielding layer BM is formed of, for example, a black-colored resin material. Although FIG. 3 illustrates only parts of the light shielding layer BM that are opposed to the signal lines D, the light shielding layer BM is disposed in a lattice shape opposed to the scanning lines S and the signal lines D in the display area DYP, and disposed to surround the display area DYP. A width in the first direction X of each part of the light shielding layer BM opposed to the signal line D is about 4 μm.

The color filter CF is disposed on the light shielding layer BM. The color filter CD includes, for example, a red colored layer R, a green colored layer G, and a blue colored layer B.

The colored layer R is disposed for the red pixels, and transmits light having a red main wavelength. The colored layer G is disposed for the green pixels, and transmits light having a green main wavelength. The colored layer B is disposed for the blue pixels, and transmits light having a blue main wavelength. Each of the colored layers R, G, and B is disposed opposite to the pixel electrodes PE arranged in the second direction Y. The color filter CF is formed of, for example, resin materials colored with the respective colors.

The overcoat layer OC covers the color filter CF. The overcoat layer OC mitigates influence of unevenness of the surface of the color filter CF.

The alignment film 30B covers the overcoat layer OC. The alignment film 30B has been subjected to alignment treatment such as rubbing and optical alignment treatment. For example, resin such as polyimide can be used as a material of the alignment film 30B. In the present embodiment, rubbing is adopted as alignment treatment for the alignment film 30B.

In the present embodiment, the color filter CF and the overcoat layer OC in the third direction Z have a width of about 3.25 μm in total.

The liquid crystal layer LQ is held between the array substrate 10 and the opposed substrate 20, and disposed between the alignment film 30A and the alignment film 30B. One of the array substrate 10 and the opposed substrate 20 is provided with pillar spacers (not shown) to maintain the cell gap between the array substrate 10 and the opposed substrate 20. The liquid crystal layer LQ is formed of liquid crystal material having, for example, a positive dielectric anisotropy. In the present embodiment, a width of the liquid crystal layer LQ in the third direction Z is about 3.3 μm.

The array substrate 10 and the opposed substrate 20 are positioned to be opposed to each other, and fixed with a sealing member (not shown) disposed to surround the display area DYP. In fixing, the array substrate 10 and the opposed substrate 20 are positioned such that the central positions of the signal lines D, the second auxiliary lines CY, and the light shielding layer BM in the first direction X are aligned along the third direction Z.

For example, since the size of the pixels PX is reduced in a high-resolution liquid crystal display device of 300 ppi or more, the ratio of lines, such as the scanning lines S and the signal lines D, and the light shielding layer (black matrix) BM to the area of the pixels PX increases and the aperture ratio may decrease. When the widths of the signal lines and the black matrix are reduced to increase the aperture ratio, the pixel color may be viewed as being mixed with the color of the adjacent pixel, in the case where the array substrate 10 is shifted from the opposed substrate 20 in alignment.

FIG. 4 and FIG. 5 are diagrams for explaining an example of an effect of the liquid crystal display device according to the present embodiment. The following explanation shows the case where the array substrate 10 is opposed to the opposed substrate 20 in positions shifted from each other by about 1.5 μm in the first direction X.

A liquid crystal display device illustrated in FIG. 4 has a structure in which second auxiliary lines CY are arranged above the signal lines D, like the liquid crystal display device of the present embodiment. A liquid crystal display device illustrated in FIG. 5 has the same structure as the liquid crystal display device illustrated in FIG. 4, except that it includes no second auxiliary lines CY.

When their color mixture ratios obtained when these liquid crystal display devices are viewed from a direction inclined by about 45° from the third direction Z toward the first direction X are compared, the color mixture ratio was 62% in the case of including no second auxiliary lines CY as illustrated in FIG. 5, and the color mixture ratio was 18% in the case of arranging the second auxiliary lines CY as illustrated in FIG. 4.

The color mixture ratio is a ratio of a width of the first direction X of a part where light that has been transmitted through the adjacent pixel is viewed to a width of the first direction X of a part where light that has been transmitted through the pixel in question. When it is explained using the examples illustrated in FIG. 4 and FIG. 5, the color mixture ratio is a ratio of a width W2 in the second direction Y of a part where light that has been transmitted through the adjacent blue pixel is viewed to a width W1 in the first direction X of a part where light that has been transmitted through the green pixel is viewed (W2/W1×100).

As described above, when second auxiliary lines CY are arranged above the signal lines D and opposite to the signal lines D, the second auxiliary lines CY serve as light shielding pattern to block the light that has been transmitted through the adjacent pixel PX, and suppress color mixture between the adjacent pixels PX. Specifically, according to the present embodiment, it is possible to provide a liquid crystal display device with good display quality.

Although the liquid crystal display device of the above embodiment is a liquid crystal display device of an FFS mode, the present invention is applicable to liquid crystal display devices of other modes, as long as a light shielding pattern opposed to the signal lines D is disposed above the signal lines D. Although it is possible to sufficiently suppress color mixture when the light shielding pattern disposed above the signal lines D has a large width in the first direction X, the aperture area of each pixel PX is reduced. Thus, the light shielding pattern desirably has a width in the first direction X that does not exceed a larger one of the width of the light shielding layer BM and the width of the signal lines D.

In the liquid crystal display device according to the above embodiment, the second auxiliary lines CY extend from one end to the other end in the second direction Y of the common electrodes. However, in the case where the common electrodes are not used as sensor electrodes of the touchpanel, the liquid crystal display device may be provided with a continuous light shielding pattern extending from one end to the other end in the second direction Y of the display area DYP. Also in such a case, the same effect as that of the above embodiment can be obtained by providing a light shielding pattern disposed above the signal lines D and opposed to the signal lines D.

In addition, although the liquid crystal display device of the above embodiment includes the color filter CF including colored layers R, G and B with three colors of red, green, and blue, it may include a color filter including colored layers of four or more colors. Since the pixel size is further reduced in the liquid crystal display device in the above case, color mixture can be more effectively suppressed by a light shielding pattern disposed opposite to the signal lines D.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    an array substrate comprising a first line extending in a first direction, a second line extending in a second direction crossing the first direction, a light shielding pattern disposed above the second line and opposed to the second line, a first pixel electrode disposed in a first area partitioned by the first line and the second line, and a second pixel electrode disposed in a second area partitioned by the first line and the second line and aligned with the first area in the first direction;
    an opposed substrate disposed opposite to the array substrate, the opposed substrate comprising a light shielding layer disposed in a position opposite to the second line, a first colored layer disposed opposite to the first pixel electrode, and a second colored layer adjacent to the first colored layer in the first direction and disposed opposite to the second pixel electrode; and
    a liquid crystal layer held between the array substrate and the opposed substrate, wherein
    the array substrate further comprises a common electrode formed of transparent electrode material and disposed opposite to the first and second pixel electrodes through an insulating layer,
    as seen in plan view, the common electrode is provided over the first and second pixel electrodes, and
    the light shielding pattern has a lattice shape, is disposed directly on the common electrode, and is electrically connected to the common electrode.

2. The liquid crystal display device according to claim 1, wherein
    the array substrate further comprises another common electrode aligned with the common electrode in the second direction, and another light shielding pattern disposed directly on the another common electrode and electrically connected to the another common electrode,
    the light shielding pattern is disposed to extend from one end to the other end of the common electrode in the second direction, and
    the another light shielding pattern is disposed to extend from one end to the other end of the another common electrode in the second direction.

3. The liquid crystal display device according to claim 1, wherein
    the width of the light shielding pattern in the first direction is less than or equal to the larger of the width of the second line and the width of the light shielding layer.

4. The liquid crystal display device according to claim 2, wherein
    the width of the light shielding pattern in the first direction is less than or equal to the larger of the width of the second line and the width of the light shielding layer.

* * * * *